UNITED STATES PATENT OFFICE.

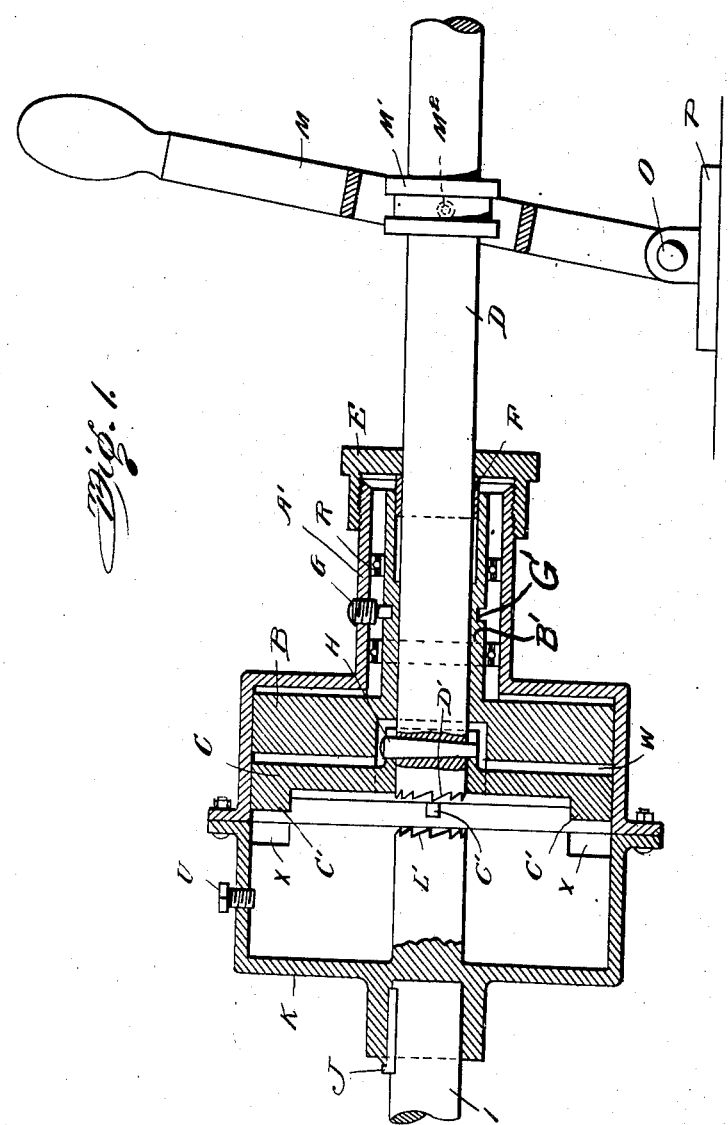

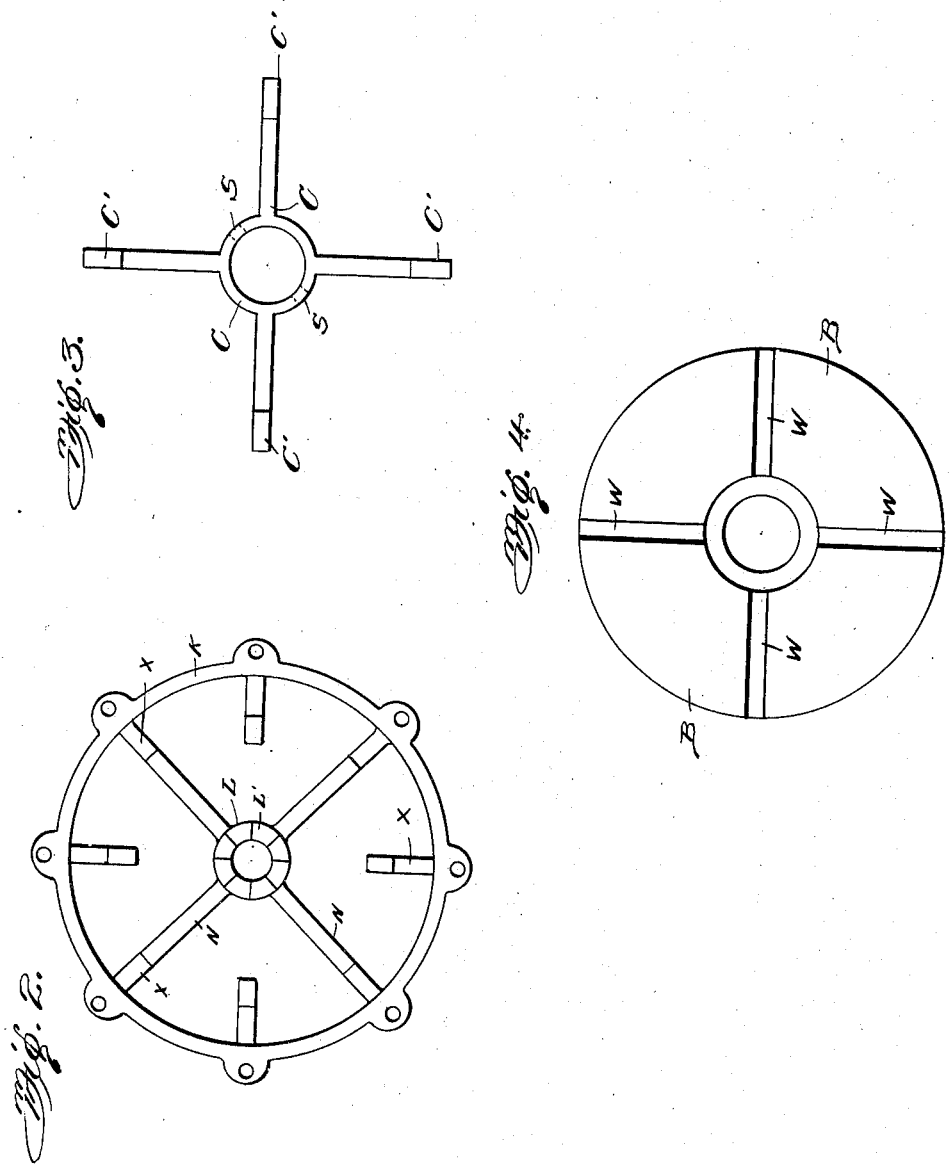

THOMAS F. RAINSFORD, OF CLEVELAND, OHIO.

FLUID-CLUTCH.

1,025,481.  Specification of Letters Patent.  Patented May 7, 1912.

Application filed June 1, 1910. Serial No. 564,479.

*To all whom it may concern:*

Be it known that I, THOMAS F. RAINSFORD, citizen of the United States, residing at Cleveland, in the county of Cuyahoga and State of Ohio, have invented certain new and useful Improvements in Fluid-Clutches, of which the following is a specification.

This invention relates to fluid clutches, and comprises a fluid clutch or transmission device associated with a positive clutch, for the purpose of transmitting motion from one shaft to another, the positive clutch coming into action after the machinery is started by the fluid clutch. The fluid clutch acts to transmit power by means of revolution of a body of liquid in a casing, with a wheel containing blades against which the fluid strikes, and by its impact will cause rotation of said wheel, which is attached to the driven shaft, said driven shaft being slidable lengthwise to put the wheel in action and to finally engage the positive clutch which locks the driving and driven shafts together. The friction clutch will thus be used for starting, and the positive clutch for continued drive.

The invention is illustrated in the accompanying drawings in which—

Figure 1 is a longitudinal section of the mechanism. Fig. 2 is a plan or face view of the driving clutch member. Fig. 3 is a similar view of the liquid-driven clutch member. Fig. 4 is a face view of a drum.

Referring specifically to the drawings 1 indicates the driving shaft as hereinafter described, although it may be the driven shaft. A circular or cup shaped casing K is keyed to the end of this shaft by the key J. On the inside this casing has ribs or paddles N cast therein, and extending radially in the casing. This casing also has a central stub shaft L, at the axis thereof, the free end of which is flush with the inner edge of the paddles, and is serrated or notched as indicated at L', forming one member of a positive clutch. Some of the paddles N extend to the center or hub of the casing; others extend only part way from the rim, as shown in Fig. 2, and all the paddles have notches or recesses X cut therein. A filling hole is closed by a screw plug U.

The casing K is bolted at its rim to one end of another concentric casing section A, the other end of which is reduced to form a sleeve A'. The driven shaft D extends into the casing section A, through the sleeve thereof, with a packing ring E to make the casing fluid-tight. A wheel having blades C is fastened on the inner end of the driven shaft D by means of a key H, said wheel having radial blades as shown in Fig. 3, the blades being offset or extended at the outer ends as shown at C', and when the wheel C is moved toward the paddles N the extensions C' will pass or travel in the recesses X in the paddles. The inner end of the shaft D is notched or serrated at D', forming the other member of the positive clutch, and coöperating with the notches L' to lock the driven shaft D to the stub shaft L which is rigidly connected with the driving shaft I.

Located between the casing A and the wheel C is a drum B which has a sleeve B' fitting over the shaft D and between said shaft and the sleeve A', to which it is locked against longitudinal motion by means of a pin G the end of which travels in a groove G' in the sleeve B, and roller bearings R are located between the sleeves so that they will rotate freely with respect to each other, the sleeve B' being also loose on the shaft D. The drum B has grooves W on its inner face into which the blades C retract when the shaft D is pulled outwardly and the clutch is disengaged. The drum B also has somewhat of the function of a fly wheel. The shaft D may be shifted in or out by means of a lever M connected by a pin $M^2$ to a grooved collar M' fast on the shaft.

The casings K and A are filled with a fluid, preferably heavy oil, and when said casings are revolved by rotation of the driver I the fluid revolves therewith, being carried around by the paddles N, and when the clutch is disengaged the blades C are retracted into the grooves W, and there is little or no turning effect on the shaft D. When the shaft D is shifted inwardly the blades C are moved out of the grooves, and receive the impact of the fluid, and will gradually attain motion which is communicated to the shaft D, and when said shaft attains the desired speed it is shifted to full extent to engage the positive clutch members D' and L' which locks the parts together and gives a practically continuous shaft and positive motion, superseding the fluid drive.

It is to be understood that the blades C, as they are gradually moved out of the grooves W, do not at once receive the full impact of the revolving fluid, and hence they take up the motion gradually. When it is desired to stop the rotation of the shaft D said shaft is shifted in the opposite direction which disengages the positive clutch and retracts the blades C into the grooves W, and when fully retracted said blades, in connection with the drum B, form a smooth surface on the inner face of said drum, so that the fluid may turn in the casing without any driving effect on the blades.

The invention is not limited to the exact embodiment shown, but various modifications may be made within the scope thereof, and the provision of the movable blades C avoids the use of controlling valves or the like, while retaining to a greater or less extent the driving power of the body of revolving fluid, and the driving power transmitted increases as the blades C are advanced toward the paddles, incident to the decrease of the space between said blades and paddles and consequently decreasing the space available for the flow of the fluid around the paddles.

In operation, when the driver I is rotated the fluid in the casings is carried around by the paddles N and when the shaft D is shifted inwardly the blades C are moved into the fluid chamber and receive the impact of the whirling fluid which communicates the motion to the shaft D. As the blades C are advanced the power transmitted is gradually increased because of the decreasing space between the paddles N and the blades C, since the available passage for the flow of the fluid is decreased accordingly. When the shaft D is shifted in to full extent the positive clutch members D' and L' are engaged. When the blades C are retracted into the grooves W the fluid chamber is clear for the rotation of the fluid without obstruction, and consequently little or no power is transmitted.

Having thus described the invention, what I claim as new and desire to secure by Letters Patent is:—

1. The combination of a rotatable casing adapted to contain a body of fluid and provided with internal paddles adapted to revolve said fluid, a shaft extending into the casing and provided at its inner end with a wheel of blades movable lengthwise of the shaft into and out of the path of said body of fluid, and means to so move the blades.

2. The combination of a rotatable casing adapted to contain a body of fluid and provided with internal paddles adapted to revolve said fluid, a shaft extending into the casing, and blades fastened to the inner end of the shaft, in the casing, the shaft being shiftable lengthwise to move the blades toward the paddles, whereby they may receive the impact of the revolving fluid.

3. The combination of a rotatable casing adapted to contain a body of fluid and provided with internal paddles adapted to revolve said fluid, a drum rotatably mounted in the casing and loose on the shaft, and having recesses, and blades fastened to the inner end of the shaft, in the casing, and between the paddles and drum, the shaft being shiftable lengthwise to advance the blades toward the paddles, or to withdraw the same into the recesses in the drum.

4. The combination of a rotatable casing adapted to contain a body of fluid and provided with internal paddles adapted to revolve said fluid, a shaft extending into the casing, and blades fastened to the inner end of the shaft, in the casing, the shaft being shiftable lengthwise to move the blades toward the paddles, whereby they may receive the impact of the revolving fluid, and a positive clutch between the casing and the shaft, engageable when the shaft is shifted inwardly to full extent.

5. The combination of a rotatable casing adapted to contain a body of liquid and having internal paddles to revolve said liquid when the casing is rotated, and also having a positive clutch member therein, and a shaft extending into the casing and shiftable in and out therein, said shaft having thereon a wheel of blades movable therewith toward and from said paddles, and also having at its inner end a positive clutch member which engages with said clutch member when the shaft is shifted in to full extent.

6. The combination of a rotatable casing adapted to contain a body of liquid and having internal paddles to revolve said liquid when the casing is rotated, a shaft extending into the casing, a grooved drum rotatable in the casing and loose on the shaft, blades fixed to the inner end of the shaft and located between said drum and paddles, and means to relatively shift the shaft and casing in an axial direction, to advance said blades toward the paddles or retract the same into the grooves in the drum.

7. The combination of a rotatable casing adapted to hold a body of liquid and provided at one end with internal paddles to revolve said body when the casing is rotated, the casing having an axial sleeve, a recessed drum located in the opposite end of the casing and having a sleeve located within said sleeve, bearings between the sleeves, a shaft one end of which extends through the sleeves and into the casing, blades fastened to the inner end of the shaft, between said drum and paddles, and means to shift the shaft in or out to advance the blades toward the paddles or retract the same into the recesses in the drum.

8. The combination of a rotatable cylindrical casing adapted to hold a body of liquid and having paddles in one end thereof to drive said liquid, a recessed drum mounted in bearings to rotate in the other end of the casing, means to prevent axial movement of the drum in the casing, a shaft extending into the casing and through the drum, blades fast on the inner end of the shaft between the drum and paddles and fitting in the recesses in the drum, and means to relatively shift the shaft and casing to advance the blades toward the paddles or retract the same into the said recesses.

In testimony whereof, I do affix my signature in presence of two witnesses.

THOMAS F. RAINSFORD.

Witnesses:
EDWARD I. HEBDAY,
R. E. BELDEN.